Oct. 18, 1927.
O. WITTEL
1,645,887
MOTOR DISCONNECTING MEANS
Filed March 25, 1926
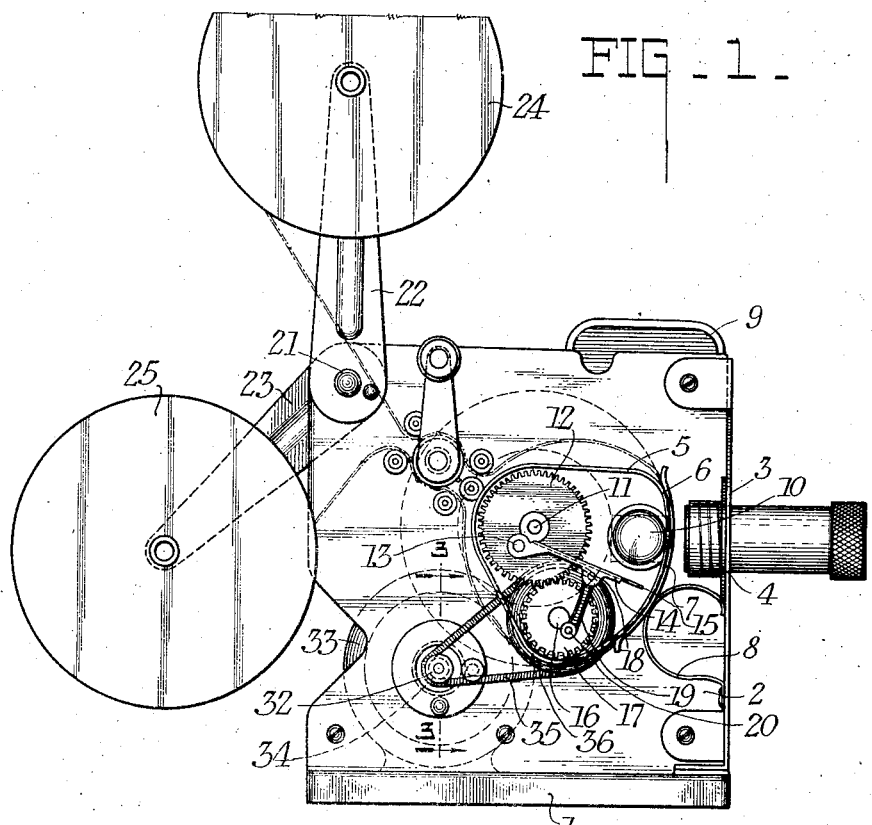
FIG_1_
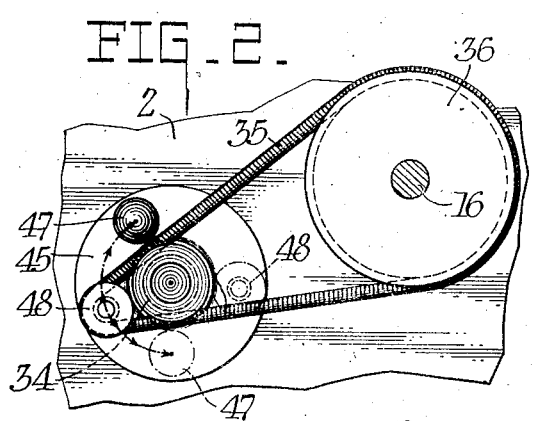
FIG_2_
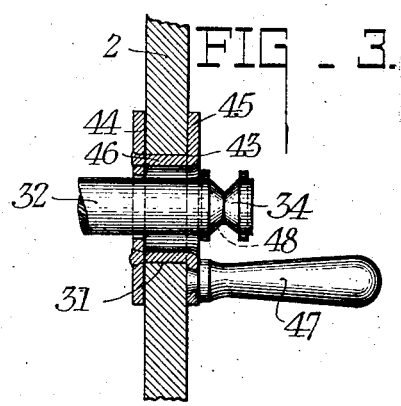
FIG_3_
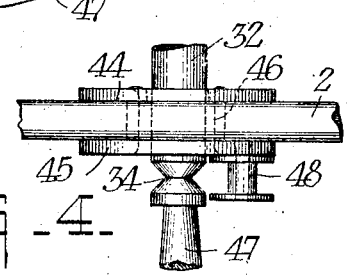
FIG_4_
INVENTOR,
Otto Wittel,
BY R. L. Stuchfield
N. M. Ferries
ATTORNEYS.

Patented Oct. 18, 1927.

1,645,887

UNITED STATES PATENT OFFICE.

OTTO WITTEL, OF ROCHESTER, NEW YORK, ASSIGNOR TO EASTMAN KODAK COMPANY, OF ROCHESTER, NEW YORK, A CORPORATION OF NEW YORK.

MOTOR-DISCONNECTING MEANS.

Application filed March 25, 1926. Serial No. 97,352.

This invention relates to motion picture apparatus and more particularly to a projector in which the mechanism is driven by a motor and in which provision is made whereby the mechanism may be stopped for the still projection of a single frame without stopping the motor. This is accomplished by a simple mechanism the construction and operation of which will be readily understandable from a reading of the following description wherein reference is made to the accompanying drawings, in the several figures of which the same reference characters denote the same parts throughout.

Fig. 1 is a side elevation of a projector embodying my invention.

Fig. 2 is a side view of my improved mechanism as applied to a driving belt.

Fig. 3 is a section on the line 3—3 of Fig. 1 and

Fig. 4 is a top view of the mechanism, unrelated parts of the projector being omitted.

This invention is shown as applied to a motion picture projector of the type disclosed in my pending applications, Serial Numbers 10,601, filed Feb. 20, 1925 and 66,155, filed Nov. 2, 1925.

The projector consists of a base 1 upon which a longitudinally arranged vertical plate 2 is supported, to the front edge of which is attached a transverse vertical plate 3, carrying the adjustable lens mount 4. The plate 2 supports a casing 5 having an arcuate gate portion 6, against which a corresponding gate member 7 is resiliently held by spring 8, secured to plate 3. Behind the plate 2 is supported a lamp house 9 from which light passes through a condenser lens 10 in support 2, to a mirror (not shown) from which it is projected through a film seated between the gate members and thence through the objective. Through the plate 2 extends a shaft 11 carrying a gear 12 to which is eccentrically pivoted at 13 one end of a lever arm 14, the other end of which constitutes a film engaging claw 15. On a stub shaft 16 is mounted a second gear 17 intermeshing with gear 12. At an intermediate point 18 of arm 14 is pivoted one end of a link 19 pivoted at its other end at 20 eccentrically to gear 17.

Pivoted at 21 on the upper rear corner of the plate 2 are two arms 22 and 23 carrying reels 24 and 25 respectively. A sprocket 26 is carried on shaft 27 and may be turned by handle 28. This is connected by gearing (not disclosed) with shaft 11. Rollers 29 hold the film 30 in its course past the sprocket and direct it from the reel 24 to the gate and thence to the reel 25.

In frame 2 is formed an aperture 31 through which extends, without bearing engagement, a shaft 32 carried by motor 33 which is carried by support 1. On the end of the shaft is a small friction pulley 34 about which passes an endless friction belt 35 which is preferably elastic and made of coiled wire. This belt also passes around pulley 36 rigidly connected with gear 17.

In aperture 31 and around shaft 32 is an annular member 43 having plates 44 and 45 on opposite surfaces of the plate 2, with the connecting bushing 46 extending through the aperture. The plate 45 on the front of the frame carries an operating handle 47 and a belt engaging roller 48. This member as a whole, may be rotated in the aperture 31, about the shaft 32, with which it does not have a bearing enagagement. In one position, indicated in Fig. 2 in dotted lines, and being the position shown in Figs. 3 and 4, the handle 47 lies below pulley 34 and the roller 48 lies within the belt 35 and between the pulleys 34 and 36, and does not have an operative engagement with the belt. When the handle is swung to the position shown in full lines in Fig. 2, the roller will pass around pulley 34 to the position shown in full lines, stretching belt 35 and passing between the belt and the pulley. It will then hold the belt stretched and out of operative engagement with pulley 34.

As thus constructed the projector may be sold without the motor and the driving belt and may be used as a manually driven projector. The motor may be added at any time by merely thrusting its extending shaft through the aperture, bolting the motor in place and adding the belt. The motor, while running, drives the mechanism and advances the film for the projection of a motion picture. Should it be desired at any instant to hold a particular picture, it is only necessary to swing the member 43, moving the roller 48 to its full line position in Fig. 2 and thus permitting the motor shaft to revolve idly without driving the rest of the mechanism. The chosen frame will then be projected as a still picture.

While I have shown this invention applied to a certain projector it is to be understood that I do not limit myself to the particular structure shown. Only such parts of the projector are disclosed as I consider desirable to disclose completely the preferred use and application of my invention, many mechanical details of the projector being omitted as unnecessary to an understanding of this invention.

Having thus described my invention, what I claim as new and desire to secure by Letters Patent is:

1. In combination, two pulleys, an endless, elastic, driving belt passing over said pulleys and adapted to transmit power between them by frictional engagement and a movable member having a path of movement past one of said pulleys whereby, due to elasticity of the belt, it may be moved from a position between the pulleys in a path between the belt and one of the pulleys to a position on the side of said pulley away from the other pulley whereby the belt is held out of operative engagement with said first pulley.

2. In combination, a driving pulley, a driven pulley, an endless, elastic belt passing around said pulleys and adapted to transmit power by frictional engagement therewith, a member pivoted to be swung about the axis of one of said pulleys between two positions, and a belt engaging projection on said member, said projection, when the member is in one position, lying between the pulleys and out of operative engagement with the belt and, when the member is in the other position, and engaging and stretching the belt and holding it out of operative engagement with one of the pulleys.

3. In combination, a mechanism for advancing a motion picture film band and including a pulley, a motor, a pulley driven by said motor, an endless elastic, driving belt passing around said pulleys and having frictional engagement therewith, and a member having an operating handle and a roller and adapted to be swung around the axis of the second mentioned pulley between two positions in one of which the roller lies between the pulleys and out of operative engagement with the belt and in the other of which the roller engages and stretches the belt and holds it out of operative engagement with the second named pulley, the roller having a path of movement past the pulley between the belt and the pulley.

Signed at Rochester, New York this 22nd day of March, 1926.

OTTO WITTEL.